(12) United States Patent
Nelson

(10) Patent No.: US 10,073,713 B2
(45) Date of Patent: *Sep. 11, 2018

(54) VIRTUAL MACHINE MIGRATION

(71) Applicant: VMware, Inc., Palo Alto, CA (US)

(72) Inventor: Michael Nelson, Alamo, CA (US)

(73) Assignee: VMware, Inc., Palo Alto, CA (US)

( * ) Notice: Subject to any disclaimer, the term of this patent is extended or adjusted under 35 U.S.C. 154(b) by 145 days.

This patent is subject to a terminal disclaimer.

(21) Appl. No.: 15/167,941

(22) Filed: May 27, 2016

(65) Prior Publication Data

US 2016/0274934 A1    Sep. 22, 2016

Related U.S. Application Data

(63) Continuation of application No. 14/624,009, filed on Feb. 17, 2015, now Pat. No. 9,354,921, which is a continuation of application No. 14/044,195, filed on Oct. 2, 2013, now Pat. No. 8,977,736, which is a continuation of application No. 13/599,759, filed on Aug. 30, 2012, now Pat. No. 8,554,900, which is a
(Continued)

(51) Int. Cl.
| | |
|---|---|
| *G06F 9/455* | (2018.01) |
| *G06F 3/06* | (2006.01) |
| *H04L 12/911* | (2013.01) |
| *G06F 9/48* | (2006.01) |
| *H04L 29/08* | (2006.01) |

(52) U.S. Cl.
CPC ........ *G06F 9/45558* (2013.01); *G06F 3/0604* (2013.01); *G06F 3/0647* (2013.01); *G06F 3/0683* (2013.01); *G06F 9/4856* (2013.01); *H04L 47/783* (2013.01); *G06F 2009/4557* (2013.01); *G06F 2009/45583* (2013.01); *G06F 2009/45595* (2013.01); *H04L 67/148* (2013.01)

(58) Field of Classification Search
CPC ............................ G06F 3/0647; H04L 67/148
USPC ...... 709/223, 224, 217, 219, 220, 221; 718/1
See application file for complete search history.

(56) References Cited

U.S. PATENT DOCUMENTS

| | | |
|---|---|---|
| 6,075,938 A | 6/2000 | Bugnion et al. |
| 6,698,017 B1 | 2/2004 | Adamovits et al. |
| (Continued) | | |

OTHER PUBLICATIONS

Online pub: "Oracle VM Manager Live Migration" Dec. 31, 2007; IBM; G. Verstraeten.
(Continued)

*Primary Examiner* — Lashonda Jacobs

(74) *Attorney, Agent, or Firm* — Patterson + Sheridan, LLP

(57) ABSTRACT

A source virtual machine (VM) hosted on a source server is migrated to a destination VM on a destination server without first powering down the source VM. After optional pre-copying of the source VM's memory to the destination VM, the source VM is suspended and its non-memory state is transferred to the destination VM; the destination VM is then resumed from the transferred state. In one embodiment, the source VM memory is either paged into the destination VM on demand, or is transferred asynchronously by pre-copying and write-protecting the source VM memory, and then later transferring only the modified pages after the destination VM is resumed. In one embodiment, the source and destination servers share common storage, in which the source VM's virtual disk is stored; this avoids the need to transfer the virtual disk contents.

20 Claims, 3 Drawing Sheets

Related U.S. Application Data continuation of application No. 12/721,899, filed on Mar. 11, 2010, now Pat. No. 8,260,904, which is a continuation of application No. 12/352,242, filed on Jan. 12, 2009, now Pat. No. 7,680,919, which is a continuation of application No. 10/319,217, filed on Dec. 12, 2002, now Pat. No. 7,484,208.

(56) References Cited

U.S. PATENT DOCUMENTS

| | | | | |
|---|---|---|---|---|
| 6,802,062 | B1* | 10/2004 | Oyamada | G06F 9/45558 718/1 |
| 7,228,337 | B1* | 6/2007 | Bornstein | H04L 29/12367 709/217 |
| 7,257,811 | B2* | 8/2007 | Hunt | G06F 9/4856 707/999.2 |
| 7,313,793 | B2* | 12/2007 | Traut | G06F 9/4856 709/201 |
| 7,484,208 | B1* | 1/2009 | Nelson | G06F 9/45558 711/6 |
| 7,577,722 | B1* | 8/2009 | Khandekar | G06F 9/45558 709/220 |
| 7,680,919 | B2 | 3/2010 | Nelson | |
| 8,191,063 | B2* | 5/2012 | Shingai | G06F 9/5088 718/1 |
| 8,356,120 | B2* | 1/2013 | Tsirkin | G06F 9/45558 710/15 |
| 2002/0156877 | A1* | 10/2002 | Lu | G06F 8/63 709/221 |
| 2003/0005102 | A1* | 1/2003 | Russell | G06F 11/0709 709/223 |
| 2004/0010787 | A1 | 1/2004 | Traut et al. | |
| 2004/0268347 | A1* | 12/2004 | Knauerhase | G06F 9/45533 718/1 |
| 2005/0132363 | A1* | 6/2005 | Tewari | G06F 9/45558 718/1 |
| 2008/0028402 | A1* | 1/2008 | Senoo | G06F 9/4856 718/1 |
| 2008/0098154 | A1* | 4/2008 | Traut | G06F 9/4856 711/6 |
| 2009/0063751 | A1* | 3/2009 | Dow | G06F 12/08 711/6 |
| 2009/0222558 | A1* | 9/2009 | Xu | G06F 9/485 709/224 |
| 2010/0169537 | A1 | 7/2010 | Nelson | |
| 2010/0250824 | A1* | 9/2010 | Belay | G06F 9/45558 711/6 |
| 2010/0299666 | A1* | 11/2010 | Agbaria | G06F 9/4856 718/1 |

OTHER PUBLICATIONS

Theimer, Marvin M. et al., "Preemptable Remote Execution Facilities for the V-System," Association for Computing Machinery, pp. 2-12, Dec. 1985.

* cited by examiner

VIRTUAL MACHINE MIGRATION

This application is a continuation of and claims priority to U.S. patent application Ser. No. 14/624,009 filed Feb. 17, 2015, which is a continuation of U.S. patent application Ser. No. 14/044,195 filed Oct. 2, 2013 (now U.S. Pat. No. 8,977,736), which is a continuation of U.S. patent application Ser. No. 13/599,759 filed Aug. 30, 2012 (now U.S. Pat. No. 8,554,900), which is a continuation of U.S. patent application Ser. No. 12/721,899, filed Mar. 11, 2010 (now U.S. Pat. No. 8,260,904), which is a continuation of U.S. patent application Ser. No. 12/352,242 filed Jan. 12, 2009 (now U.S. Pat. No. 7,680,919), which is a continuation of U.S. patent application Ser. No. 10/319,217, filed Dec. 12, 2002 (now U.S. Pat. No. 7,484,208), each of which is entitled "Virtual Machine Migration." Each of the above applications is incorporated by reference in its entirety.

TECHNICAL FIELD

This invention relates to a computer architecture, in particular, to an architecture that coordinates the operation of multiple virtual machines.

BACKGROUND

The advantages of virtual machine technology have become widely recognized. Among these advantages is the ability to run multiple virtual machines on a single host platform. This makes better use the capacity of the hardware, while still ensuring that each user enjoys the features of a "complete," isolated computer.

General virtualized computer system: As is well known in the field of computer science, a virtual machine (VM) is a software abstraction—a "virtualization"—of an actual physical computer system. FIG. 1 illustrates, in part, the general configuration of a virtual machine 200, which is installed as a "guest" on a "host" hardware platform 100.

As FIG. 1 shows, the hardware platform 100 includes one or more processors (CPU's) 110, system memory 130, and a storage device, which will typically be a disk 140. The system memory will typically be some form of high-speed RAM, whereas the disk (one or more) will typically be a non-volatile, mass storage device. The hardware 100 will also include other conventional mechanisms such as a memory management unit MMU 150, various registers 160, and any conventional network connection device 170 (such as a network adapter or network interface card—"NIC") for transfer of data between the various components of the system and a network 700, which may be any known public or proprietary local or wide-area network such as the Internet, an internal enterprise network, etc.

Each VM 200 will typically include at least one virtual CPU 210, a virtual disk 240, a virtual system memory 230, a guest operating system (which may simply be a copy of a conventional operating system) 220, and various virtual devices 230, in which case the guest operating system ("guest OS") will include corresponding drivers 224. All of the components of the VM may be implemented in software using known techniques to emulate the corresponding components of an actual computer.

If the VM is properly designed, then it will not be apparent to the user that any applications 260 running within the VM are running indirectly, that is, via the guest OS and virtual processor. Applications 260 running within the VM will act just as they would if run on a "real" computer, except for a decrease in running speed that will be noticeable only in exceptionally time-critical applications. Executable files will be accessed by the guest OS from the virtual disk or virtual memory, which will simply be portions of the actual physical disk or memory allocated to that VM. Once an application is installed within the VM, the guest OS retrieves files from the virtual disk just as if they had been pre-stored as the result of a conventional installation of the application. The design and operation of virtual machines is well known in the field of computer science.

Some interface is usually required between a VM and the underlying host platform (in particular, the CPU), which is responsible for actually executing VM-issued instructions and transferring data to and from the actual memory and storage devices. A common term for this interface is a "virtual machine monitor" (VMM), shown as component 300. A VMM is usually a thin piece of software that runs directly on top of a host, or directly on the hardware, and virtualizes all the resources of the machine. Among other components, the VMM therefore usually includes device emulators 330, which may constitute the virtual devices (230) that the VM 200 addresses. The interface exported to the VM is then the same as the hardware interface of the machine, so that the guest OS cannot determine the presence of the VMM. The VMM also usually tracks and either forwards (to some form of operating system) or itself schedules and handles all requests by its VM for machine resources, as well as various faults and interrupts.

Although the VM (and thus the user of applications running in the VM) cannot usually detect the presence of the VMM, the VMM and the VM may be viewed as together forming a single virtual computer. They are shown in FIG. 1 as separate components for the sake of clarity.

Virtual and physical memory: As in most modern computers, the address space of the memory 130 is partitioned into pages (for example, in the Intel x86 architecture) or regions (for example, Intel IA-64 architecture). Applications then address the memory 130 using virtual addresses (VAs), which include virtual page numbers (VPNs). The VAs are then mapped to physical addresses (PAs) that are used to address the physical memory 130. (VAs and PAs have a common offset from a base address, so that only the VPN needs to be converted into a corresponding PPN.) The concepts of VPNs and PPNs, as well as the way in which the different page numbering schemes are implemented and used, are described in many standard texts, such as "Computer Organization and Design: The Hardware/Software Interface," by David A. Patterson and John L. Hennessy, Morgan Kaufmann Publishers, Inc., San Francisco, Calif., 1994, pp. 579-603 (chapter 7.4 "Virtual Memory"). Similar mappings are used in region-based architectures or, indeed, in any architecture where relocatability is possible.

An extra level of addressing indirection is typically implemented in virtualized systems in that a VPN issued by an application 260 in the VM 200 is remapped twice in order to determine which page of the hardware memory is intended. The first mapping is provided by a mapping module within the guest OS 202, which translates the guest VPN (GVPN) into a corresponding guest PPN (GPPN) in the conventional manner. The guest OS therefore "believes" that it is directly addressing the actual hardware memory, but in fact it is not.

Of course, a valid address to the actual hardware memory must ultimately be generated. A memory management module 350 in the VMM 300 therefore performs the second mapping by taking the GPPN issued by the guest OS 220 and mapping it to a hardware (or "machine") page number PPN that can be used to address the hardware memory 130.

This GPPN-to-PPN mapping is typically done in the main system-level software layer (such as the kernel 600 described below), depending on the implementation: From the perspective of the guest OS, the GVPN and GPPN might be virtual and physical page numbers just as they would be if the guest OS were the only OS in the system. From the perspective of the system software, however, the GPPN is a page number that is then mapped into the physical memory space of the hardware memory as a PPN.

System software configurations in virtualized systems: In some systems, such as the Workstation product of VMware, Inc., of Palo Alto, Calif., the VMM is co-resident at system level with a host operating system. Both the VMM and the host OS can independently modify the state of the host processor, but the VMM calls into the host OS via a driver and a dedicated user-level application to have the host OS perform certain I/O operations of behalf of the VM. The virtual computer in this configuration is thus fully hosted in that it runs on an existing host hardware platform and together with an existing host OS.

In other implementations, a dedicated kernel takes the place of and performs the conventional functions of the host OS, and virtual computers run on the kernel. FIG. 1 illustrates a kernel 600 that serves as the system software for several VM/VMM pairs 200/300, . . . , 200n/300n. Compared with a system in which VMMs run directly on the hardware platform, use of a kernel offers greater modularity and facilitates provision of services that extend across multiple VMs (for example, for resource management). Compared with the hosted deployment, a kernel may offer greater performance because it can be co-developed with the VMM and be optimized for the characteristics of a workload consisting of VMMs. The ESX Server product of VMware, Inc., has such a configuration.

A kernel-based virtualization system of the type illustrated in FIG. 1 is described in U.S. patent application Ser. No. 09/877,378 ("Computer Configuration for Resource Management in Systems Including a Virtual Machine"), which is incorporated here by reference. The main components of this system and aspects of their interaction are, however, outlined below.

At a boot-up time, an existing operating system 420 may be at system level and the kernel 600 may not yet even be operational within the system. In such case, one of the functions of the OS 420 may be to make it possible to load the kernel 600, after which the kernel runs on the native hardware and manages system resources. In effect, the kernel, once loaded, displaces the OS 420. Thus, the kernel 600 may be viewed either as displacing the OS 420 from the system level and taking this place itself, or as residing at a "sub-system level." When interposed between the OS 420 and the hardware 100, the kernel 600 essentially turns the OS 420 into an "application," which has access to system resources only when allowed by the kernel 600. The kernel then schedules the OS 420 as if it were any other component that needs to use system resources.

The OS 420 may also be included to allow applications unrelated to virtualization to run; for example, a system administrator may need such applications to monitor the hardware 100 or to perform other administrative routines. The OS 420 may thus be viewed as a "console" OS (COS). In this case, the kernel 600 preferably also provides a remote procedure call (RPC) mechanism 614 to enable communication between, for example, the VMM 300 and any applications 800 installed to run on the COS 420.

Worlds: The kernel 600 handles not only the various VMM/VMs, but also any other applications running on the kernel, as well as the COS 420 and even the hardware CPU(s) 110, as entities that can be separately scheduled. In this disclosure, each schedulable entity is referred to as a "world," which contains a thread of control, an address space, machine memory, and handles to the various device objects that it is accessing. Worlds, represented in FIG. 1 within the kernel 600 as module 612, are stored in a portion of the memory space controlled by the kernel. Each world also has its own task structure, and usually also a data structure for storing the hardware state currently associated with the respective world.

There will usually be different types of worlds: 1) system worlds, which are used for idle worlds, one per CPU, and a helper world that performs tasks that need to be done asynchronously; 2) a console world, which is a special world that runs in the kernel and is associated with the COS 420; and 3) virtual machine worlds.

Worlds preferably run at the most-privileged level (for example, in a system with the Intel x86 architecture, this will be level CPL0), that is, with full rights to invoke any privileged CPU operations. A VMM, which, along with its VM, constitutes a separate world, therefore may use these privileged instructions to allow it to run its associated VM so that it performs just like a corresponding "real" computer, even with respect to privileged operations.

Switching worlds: When the world that is running on a particular CPU (which may be the only one) is preempted by or yields to another world, then a world switch has to occur. A world switch involves saving the context of the current world and restoring the context of the new world such that the new world can begin executing where it left off the last time that it is was running.

The first part of the world switch procedure that is carried out by the kernel is that the current world's state is saved in a data structure that is stored in the kernel's data area. Assuming the common case of an underlying Intel x86 architecture, the state that is saved will typically include: 1) the exception flags register; 2) general purpose registers; 3) segment registers; 4) the instruction pointer (EIP) register; 5) the local descriptor table register; 6) the task register; 7) debug registers; 8) control registers; 9) the interrupt descriptor table register; 10) the global descriptor table register; and 11) the floating point state. Similar state information will need to be saved in systems with other hardware architectures.

After the state of the current world is saved, the state of the new world can be restored. During the process of restoring the new world's state, no exceptions are allowed to take place because, if they did, the state of the new world would be inconsistent upon restoration of the state. The same state that was saved is therefore restored. The last step in the world switch procedure is restoring the new world's code segment and instruction pointer (EIP) registers.

When worlds are initially created, the saved state area for the world is initialized to contain the proper information such that when the system switches to that world, then enough of its state is restored to enable the world to start running. The EIP is therefore set to the address of a special world start function. Thus, when a running world switches to a new world that has never run before, the act of restoring the EIP register will cause the world to begin executing in the world start function.

Switching from and to the COS world requires additional steps, which are described in U.S. patent application Ser. No. 09/877,378, mentioned above. Understanding this process is not necessary for understanding the present invention, however so further discussion is omitted.

Memory management in kernel-based system: The kernel 600 includes a memory management module 616 that manages all machine memory that is not allocated exclusively to the COS 420. When the kernel 600 is loaded, the information about the maximum amount of memory available on the machine is available to the kernel, as well as information about how much of it is being used by the COS. Part of the machine memory is used for the kernel 600 itself and the rest is used for the virtual machine worlds.

Virtual machine worlds use machine memory for two purposes. First, memory is used to back portions of each world's memory region, that is, to store code, data, stacks, etc., in the VMM page table. For example, the code and data for the VMM 300 is backed by machine memory allocated by the kernel 600. Second, memory is used for the guest memory of the virtual machine. The memory management module may include any algorithms for dynamically allocating memory among the different VM's 200.

Interrupt handling in kernel-based system: The kernel 600 preferably also includes an interrupt handler 650 that intercepts and handles interrupts for all devices on the machine. This includes devices such as the mouse that are used exclusively by the COS. Depending on the type of device, the kernel 600 will either handle the interrupt itself or forward the interrupt to the COS.

Device access in kernel-based system: In the preferred embodiment of the invention, the kernel 600 is responsible for providing access to all devices on the physical machine. In addition to other modules that the designer may choose to load into the kernel, the kernel will therefore typically include conventional drivers as needed to control access to devices. Accordingly, FIG. 1 shows within the kernel 600 a module 610 containing loadable kernel modules and drivers.

Kernel file system: In the ESX Server product of VMware, Inc., the kernel 600 includes a fast, simple file system, referred to here as the VM kernel file system (VMKFS), that has proven itself to be particularly efficient for storing virtual disks 240, which typically comprise a small number of large (at least 1 GB) files. By using very large file system blocks, the file system is able to keep the amount of metadata (that is, the data that indicates where data blocks are stored on disk) needed to access all of the data in a file to an arbitrarily small size. This allows all of the metadata to be cached in main memory so that all file system reads and writes can be done without any extra metadata reads or writes.

The VMKFS in ESX Server takes up only a single disk partition. When it is created, it sets aside space for the file system descriptor, space for file descriptor information, including the file name, space for block allocation information, and space for block pointer blocks. The vast majority of the partition's space is used for data blocks, whose size is set when the file system is created. The larger the partition size, the larger the block size should be in order to minimize the size of the metadata.

As mentioned earlier, the main advantage of the VMKFS is that it ensures that all metadata may be cached in high-speed, main system memory. This can be done by using large data block sizes, with small block pointers. Since virtual disks are usually at least one gigabyte in size, using large block sizes on the order of 64 Megabytes will cause virtually no wasted disk space and all metadata for the virtual disk can be cached simultaneously in system memory.

Besides being able to always keep file metadata cached in memory, the other key to high performance file I/O is to reduce the number of metadata updates. Note that the only reason why the VMKFS metadata will need to be updated is if a file is created or destroyed, or if it changes in size. Since these files are used primarily for virtual disks (or, for example, for copy-on-write redo logs), files are not often created or destroyed. Moreover, because virtual disks are usually fixed in size upon creation, the file size of a virtual disk does not usually change. In order to reduce the number of metadata updates on a virtual disk to zero, the system may therefore preallocate all data blocks for virtual disks when the file is created.

Key VM features: For the purposes of understanding the advantages of this invention, the salient points of the discussion above are: (1) each VM 200, . . . , 200n has its own state and is an entity that can operate completely independently of other VMs; (2) the user of a VM, in particular, of an application running on the VM, will usually not be able to notice that the application is running on a VM (which is implemented wholly as software) as opposed to a "real" computer; (3) assuming that different VMs have the same configuration and state, the user will not know and would have no reason to care which VM he is currently using; (4) the entire state (including memory) of any VM is available to its respective VMM, and the entire state of any VM and of any VMM is available to the kernel 600; (5) as a consequence of the above facts, a VM is "relocatable."

Except for the network 700, the entire multi-VM system shown in FIG. 1 can be implemented in a single physical machine, such as a server. This is illustrated by the single functional boundary 1000. (Of course devices such as keyboards, monitors, etc., will also be included to allow users to access and use the system, possibly via the network 700; these are not shown merely for the sake of simplicity.)

In systems configured as in FIG. 1, the focus is on managing the resources of a single physical machine: Virtual machines are installed on a single hardware platform and the CPU(s), network, memory, and disk resources for that machine are managed by the kernel 600 or similar server software. This represents a limitation that is becoming increasingly undesirable and increasingly unnecessary. For example, if the server 1000 needs to be shut down for maintenance, then the VMs loaded in the server will become inaccessible and therefore useless to those who need them. Moreover, since the VMs must share the single physical memory space 130 and the cycles of the single (or single group of) CPU, these resources are substantially "zero-sum," such that particularly memory- or processor-intensive tasks may cause noticeably worse performance.

One way to overcome this problem would be to provide multiple servers, each with a set of VMs. Before shutting down one server, its VMs could be powered down or checkpointed and then restored on another server. The problem with this solution is that it still disrupts on-going VM use, and even a delay of ten seconds may be noticeable and irritating to users; delays on the order of minutes will normally be wholly unacceptable.

What is needed is a system that allows greater flexibility in the deployment and use of VMs, but with as little disruption to users as possible. This invention provides such a system, as well as a related method of operation.

SUMMARY

In a networked system of computers (preferably, servers), including a source computer and a destination computer and a source virtual machine (VM) installed on the source computer, the invention provides a virtualization method and system according to which the source VM is migrated to a destination VM while the source VM is still powered on.

Different methods are provided for transferring the source VM's memory to the destination VM. In the preferred embodiment of the invention, the destination VM may be resumed before transfer of the source VM memory is completed. One way to do this is to page in the source VM memory to the destination VM on demand. Following an alternative procedure, the source VM memory is pre-copied to the destination VM before the non-memory source VM state information is transferred.

In one refinement of the invention, any units (such as pages) of the source VM memory that are modified (by the source VM or by any other component) during the interval between pre-copying and completing transfer of all pages are retransferred to the destination VM. Modification may be detected in different ways, preferably by write-protecting the source VM memory and then sensing page faults when the source VM attempts to write to any of the protected memory units. An iterative procedure for retransferring modified memory units is also disclosed.

In the preferred embodiment of the invention, the source VM's non-memory state information includes the contents of a source virtual disk. The contents of the source virtual disk are preferably stored in a storage arrangement shared by both the source and destination computers. The destination VM's virtual disk is then prepared by mapping the virtual disk of the destination VM to the same physical addresses as the source virtual disk in the shared storage arrangement.

In the most commonly anticipated implementation of the invention, communication between a user and the source and destination VMs takes place over a network. Network connectivity is preferably also made transparent to the user by arranging the servers on a common subnet, with virtual network connection addresses generated from a common name space of physical addresses.

DETAILED DESCRIPTION

In broadest terms, the invention provides a farm of servers, each of which may host one or more virtual machines (VMs), as well as mechanisms for migrating a VM from one server (the source server) to another (the destination server) while the VM is still running. There are many reasons why efficient, substantially transparent VM migration is beneficial. Load-balancing is mentioned above, as is the possibility that a machine may need to be taken out of service for maintenance.

Another reason may be to add or remove resources from the server. This need not be related to the requirements of the hardware itself, but rather it may also be to meet the desires of a particular user/customer. For example, a particular user may request (and perhaps pay for) more memory, more CPU time, etc., all of which may necessitate migration of his VM to a different server.

Figure 1:
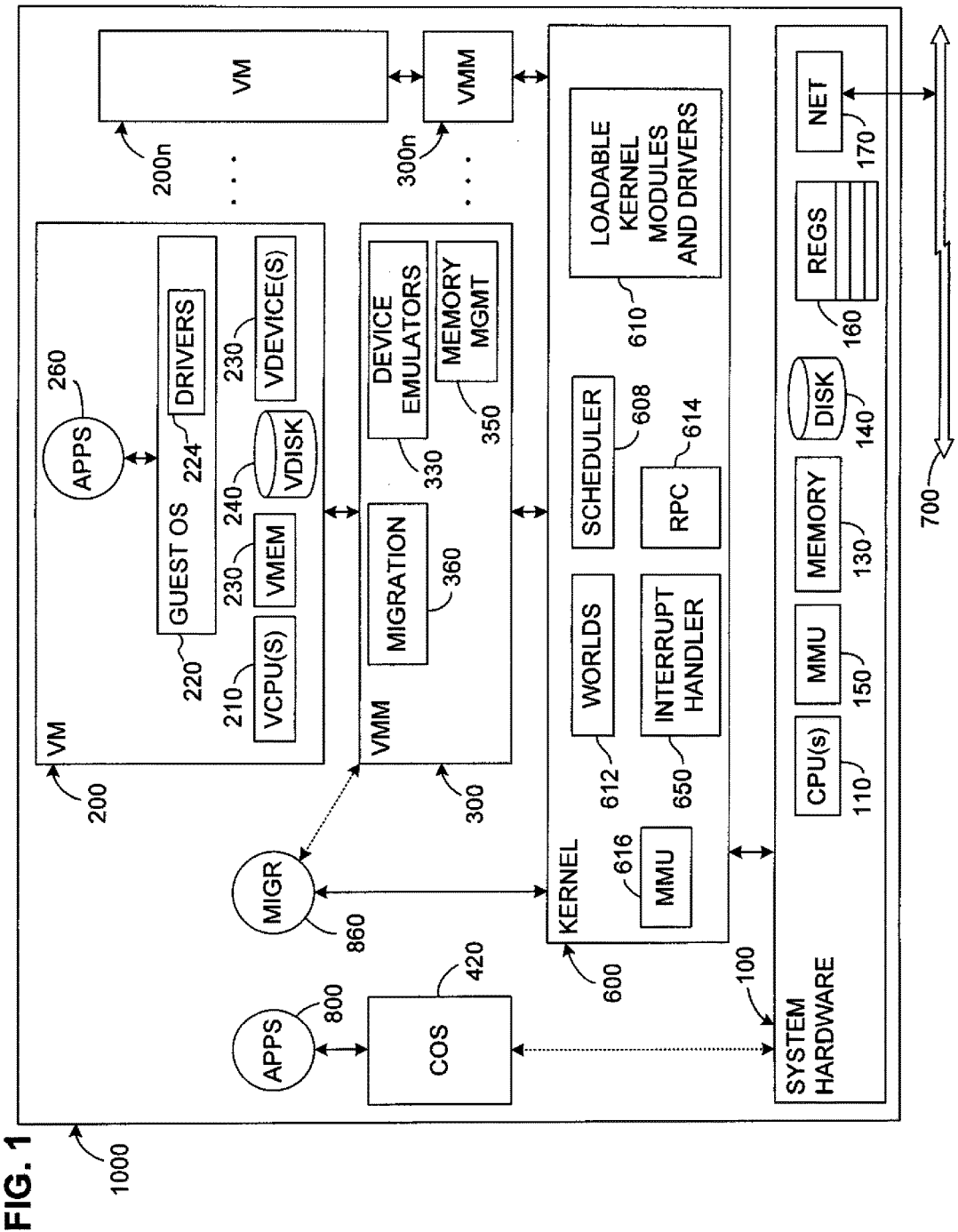
FIG. 1 illustrates the main components of a server that includes one or more virtual machines running on a system-level kernel.
Figure 2:
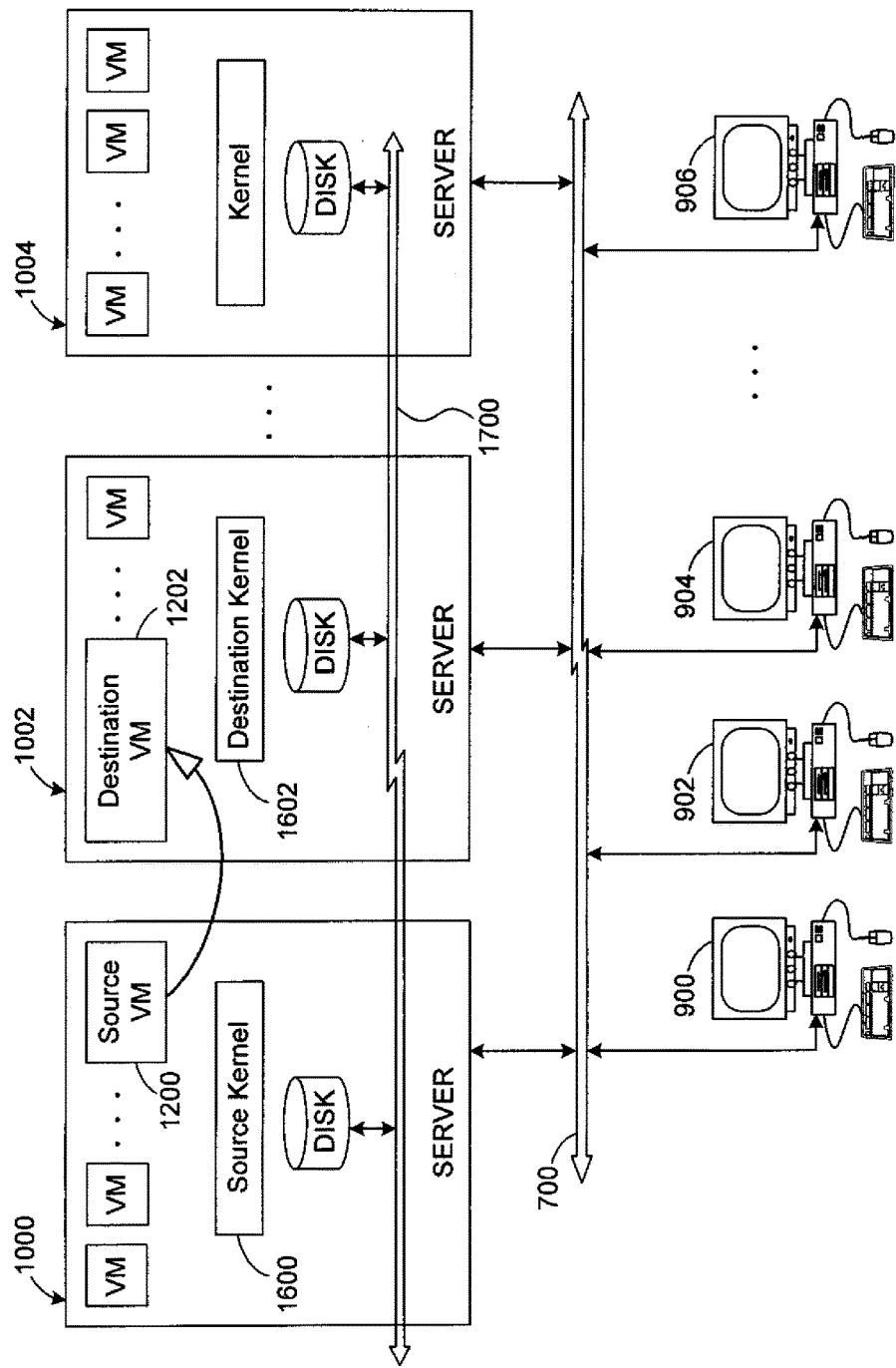
FIG. 2 illustrates a farm of interconnected servers according to the invention, with each server hosting a plurality of virtual machines.

The general configuration of the server farm according to the invention is illustrated in FIG. 2, in which a plurality of users 900, 902, 904, . . . , 906 access a farm of servers 1000, 1002, . . . , 1004 via the network 700. Each of the servers is preferably configured as the server 1000 shown in FIG. 1, and will include at least one and possibly many VMs. Thus, server 1000 is shown in both FIG. 1 and FIG. 2.

In a server farm, all of the resources of all of the machines in the farm can be aggregated into one common resource pool. From the perspective of a user, the farm will appear to be one big machine with lots of resources. As is described below, the invention provides a mechanism for managing the set of resources so that they are utilized as efficiently and as reliably as possible.

Advantages of VM migration: The ability to quickly migrate VMs while they are running between individual nodes of the server farm has several advantages, among which are the following: (1) It allows the load to be balanced across all nodes in the cluster. If one node is out of resources while other nodes have free resources, then VMs can be moved around between nodes to balance the load. (2) It allows individual nodes of the cluster to be shut down for maintenance without requiring that the VMs that are running on the node be shut down: Instead of shutting the VMs down, the VMs can simply be migrated to other machines in the cluster. (3) It allows the immediate utilization of new nodes as they are added to the cluster. Currently running VMs can be migrated from machines that are over utilized to newly added machines that have free resources.

Goals of VM migration: There are two primary goals for VM migration: First, the time that the migrated VM is unavailable should be minimized. This is because if the VM is unavailable for more than a few seconds, clients that depend on services exported by the VM may become unhappy. The migration therefore needs to be transparent to clients of the VM. Second, the time that the VM is dependent on state stored on the source machine should also be minimized because as long as the VM is dependent on the source machine the VM is less fault-tolerant than before it was migrated.

Assumptions: The preferred embodiment of the invention makes two assumptions, which, although not necessary to the main definition of the invention, greatly simplify its implementation. Those skilled in the art of computer design and system-level programming will be able to adapt the preferred embodiment of the invention to avoid the need for these assumptions, for example, to provide a custom implementation for particularly important users. The two simplifying assumptions are: First, VMs will be migrated only between machines that share the storage where the VMs' disks reside. This assumption eliminates the need to migrate entire disks. In order to allow for inter-server migration, the servers 1000, 1002, . . . , 1004 therefore either share an external, common storage system or can access each other's internal storage. One way to arrange this is for all the servers in the farm to be connected via a system such as Fibrechannel; this is illustrated in FIG. 2 as the channel 1700. Second, in the preferred embodiment of the invention, VMs are migrated only between machines whose network adapters are on the same subnet that is being used by the VM.

Suspend-and-resume: Existing VM technology makes possible the suspension and resumption of a VM. This feature is found, for example, in the ESX Server product mentioned above. Moreover, co-pending U.S. patent application Ser. No. 09/497,978, filed 4 Feb. 2000 ("Encapsulated Computer System"), which is incorporated here by reference, discloses a mechanism for checkpointing the entire state of a VM. When a VM is suspended, all of its state (including its memory) is written to a file on disk. A VM can then be migrated by suspending the VM on one server and resuming it via shared storage on another server. Unfortunately, writing out the saved state, especially the memory, to disk and then reading it back in again on the new server is too slow. This is especially true for VMs with large memories. Even a relatively small 512 Mbyte VM would, for example, take at least 20 or 30 seconds to suspend and then resume again. Larger VMs of 2 or 4 Gigabytes would take even longer. These delays are unacceptable.

Another disadvantage of migration using the current technology is that it consumes large amounts of disk bandwidth, especially if the suspend-and-resume operations must be done quickly. This can be especially problematic if the reason that a VM is being migrated is because the machine (server) that it is running on is low on available disk bandwidth.

Note that the execution of a VM is frequently suspended even though it is "running." A VM may be suspended, for example, in order to allow execution of another co-running VM to proceed. Suspending the VM long enough to transfer its non-memory state is therefore not inconsistent with the notion that it is still running. Suspension for the purpose of non-memory state transfer contrasts however, with powering down or "shutting off" the VM, which is the software mechanism that virtualizes the power-down procedure of a physical machine. For example, suspension does not necessarily lead to loss of cached data, whereas powering-off typically does. Similarly, resumption of execution after a suspension does not require such time-consuming tasks as rebooting the OS, whereas powering back on ("restarting") typically does. The invention allows the source VM to be migrated with no need to power down the VM.

Migration: FIG. 2 illustrates migration of a VM (the source VM 1200) in server 1000 to a VM (the destination VM 1202) in server 1002. The respective servers may therefore be referred to respectively as the "source" and "destination" servers or machines. In order to migrate a VM from one server (the source) to another (the destination), three things need to be transferred to the destination machine. In decreasing order of size, these are 1) the disk; 2) the memory; and 3) saved non-memory state for the frame buffer, all virtual devices and whatever else is needed to resume from a checkpoint. This additional required information will depend on how the VMs are configured, but will be known to the designer who wishes to take advantage of this invention.

Note that memory itself is included in the concept of the state of a VM; indeed, memory is the dominant portion. In the preferred embodiment of the invention, however, memory is treated as a special case because it is relatively so large.

Now recall the first assumption above that the servers on which the source and destination VMs run share storage. This means that the source VM's virtual disk can be transferred without copying any data—all that is needed is for the destination VMM to ensure that the mappings for the destination VM's virtual disk are to the same physical addresses in the shared storage arrangement as the source VM's, which will not have changed. The other state, however, must be transferred to the destination machine in order to complete the migration. According to the invention, this other state information is transferred directly between the source and destination machines, without performing the intermediate step of writing the state to disk.

Memory is either transferred ahead of time while the VM is running or is paged in from the source machine after the VM has resumed on the destination machine. All other saved non-memory state is transferred directly from the source VM to the destination machine. The only time the VM will be unavailable to the user is therefore while the saved non-memory state is being transferred by the source to the destination and while the saved non-memory state is being restored on the destination. Because the saved non-memory state is typically less than 20 Mbytes, and because this transfer can be direct, that is, requiring no intermediate physical disk operations, it will take only a few seconds to save and restore the non-memory state across a conventional broadband network link.

Figure 3:
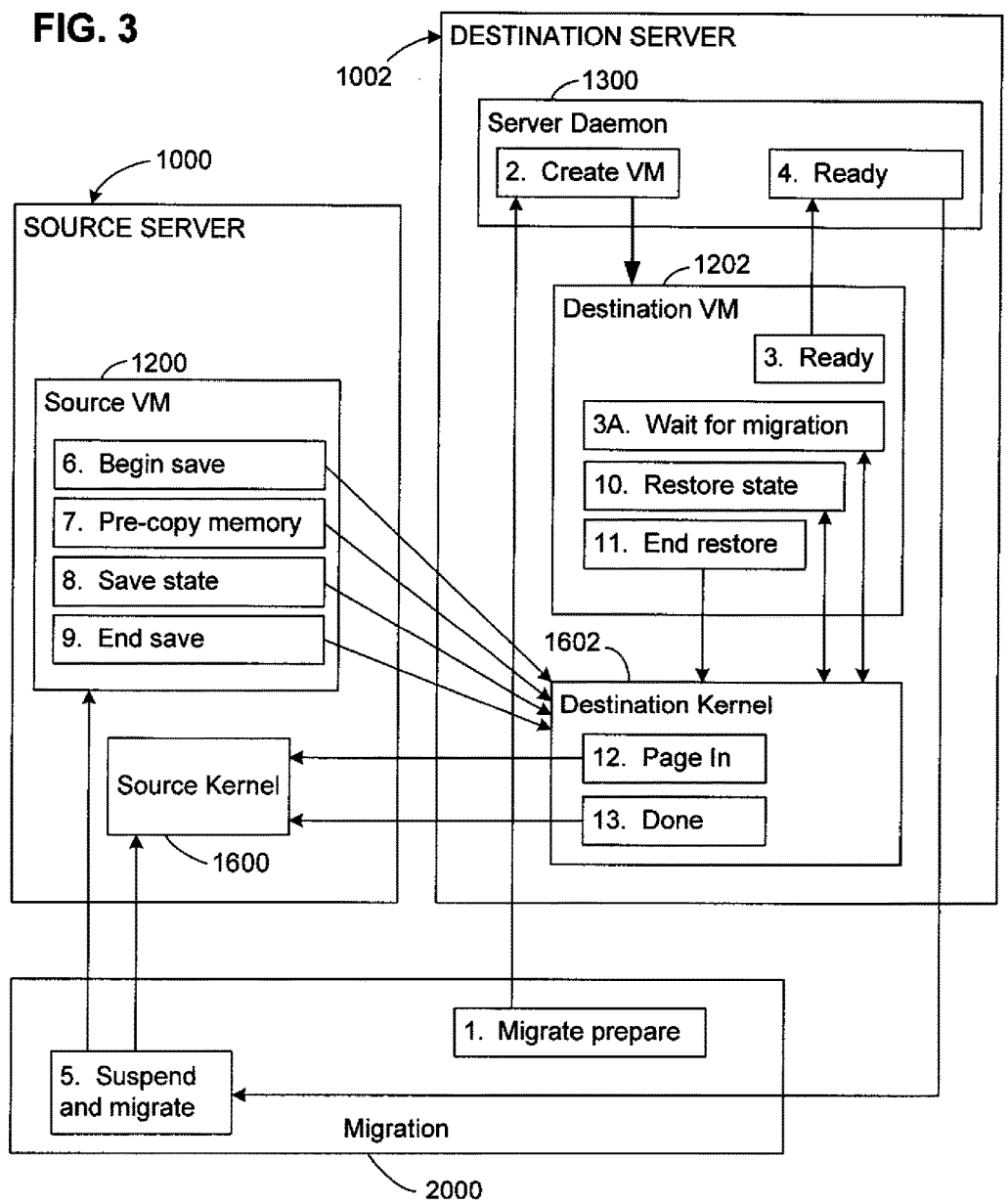
FIG. 3 illustrates the steps the invention takes to migrate a virtual machine from a source to a destination.

In FIGS. 2 and 3, the VMMs for each VM are not shown simply for the sake of simplicity. The VM can be transferred without requiring any transfer of state information about its respective VMM, and the VMM is transparent to the VM. Nonetheless, for the sake of simplicity, when it is stated below that the VM performs a certain migration-related action, it is to be understood that the instructions for performing these actions are preferably not part of the VM's code (in order to maintain transparency). Rather, the migration code may be located in any of several components that are external and transparent to the VM being migrated: In a prototype of the invention, for example, the migration code was included within the VMM (module 360), which interacted with a dedicated user-level application 860 configured as in the VMware Workstation product mentioned above.

Migration Components

Migration Components: There are several entities involved in performing a migration, each of which is a software module, that is, a set of computer instructions, that will execute on the processor(s) of the respective server:

1. An initiator of the migration, which may be located anywhere in the system other than in the VM to be migrated. A load-balancing module in some supervisory system that monitors the operation of the servers might initiate migration, for example. An administrator (human and/or automatic) might also initiate migration of VMs from one server to one or more others because of a need for maintenance, repair, upgrade, etc. As another example, a kernel will generally be aware of the memory available to the VMs it supports; if these VMs' memory requirements are particularly high, then the kernel might poll other kernels to find a different server whose memory load is currently less and then migrate one or more VMs to that server. In one prototype of the invention, the migration initiator was formed of cooperating software modules within the VMM of the VM to be migrated and the dedicated user-level application 860 (FIG. 1). In FIG. 3, the initiator is shown as being located in a general migration sub-system 2000, which will be included in whatever component(s) the designer prefers for a given implementation of the invention.

2. A service process or "daemon" 1300 that runs on the destination server and that is capable of configuring and starting up the destination VM. Such daemons are found in existing virtualization systems, such as those of VMware, Inc.

3. The source VM 1200 for the migration. This is the VM that is running on the source server 1000 and that is being migrated to the destination server 1002.

4. The destination VM 1202 for the migration.

5. The kernel (or equivalent system software) on the destination machine (the "destination kernel" 1602).

6. The kernel (or equivalent system software) on the source machine (the "source kernel" 1600).

Migration Procedures: According to the invention, the main steps involved in a migration are: a) preparing for VM migration; b) optionally, pre-copying at least a portion of the source VM memory to the destination; c) suspending the source VM while transferring its non-memory state information to the destination VM; and d) transferring remaining memory from the source to the destination. Each of these main steps in turn comprises several sub-steps, which are illustrated in FIG. 3.

FIG. 3 is a structural flowchart (showing both the operations and components involved) of the procedures according to the preferred embodiment of the invention for migrating a VM. In FIG. 3, the various procedural steps are numbered 1-13. As mentioned above, no VM needs to include code to perform any of the actions involved in the migration; rather, this code will be located in the VM's respective VMM or some other user- and/or system-level software component (s). In FIG. 3, various migration steps are shown within the source and destination VMs merely for the sake of clarity and to illustrate that it is these components that are the object of the operations.

Preparing for migration: The first step in a VM migration is that the initiating sub-system (within component 2000) requests the migration (Step 1) for any reason, such as those mentioned as examples above. In order to minimize the down time for a running source VM 1200 during the migration process, a destination VM 1202 needs to be created and put into a wait state before the source VM begins migration. Upon receipt of any suitable initiation signal and parameters from the sub-system 2000, the destination VM 1202 is therefore created (Step 2) by a service—the server daemon 1300—that runs on the destination machine. As is mentioned above, such VM creation routines are found in existing virtualization systems; any such known routine may be used in the invention.

Once the destination VM is created, its VMM informs the daemon 1300 that it is ready to accept migration (Step 3). The daemon then calls into the destination kernel 1602 to notify it that state information can be transferred from the source VM. The destination kernel will return an error if no state is available to be restored. The VM expects this and, as part of waiting for migration (Step 3A), keeps retrying until the destination kernel is ready to begin restoring state. The daemon 1300 also indicates to other components (for example, the source and destination kernels and/or the general migration component 2000) that the destination VM is ready for migration (Step 4).

Transferring non-memory state information: Once the destination VM is ready, the source VM is suspended long enough (using known techniques) that its non-memory state information can be transferred to and saved in the destination VM. The sub-system 2000 therefore indicates to the source VMM and/or kernel 1600 that the source VM should be suspended and that migration should be started (Step 5). Note that a non-memory state transfer will usually be a relatively fast operation compared with transferring the source VMs memory, so that the source VM's suspension should not be so long that it inconveniences the user.

Transferring non-memory state information: The source VM 1200 (that is, its VMM) first interacts with the destination kernel 1602 to signal the kernel to prepare to accept the saved non-memory state. Once execution of the source VM is suspended, the source VM's non-memory state can be saved, that is, transferred and stored in the destination (Step 6). Transfer may be done using any known technology, such as over a TCP/IP connection.

If asynchronous memory transfer is implemented (see below), the source VM's memory may also be pre-copied (Step 7) to the destination machine while the source VM is still running. The source memory is dealt with specially and is discussed below. Once all the source VM's non-memory state information has been saved (Step 8) in the destination, the source VM (again, meaning its VMM) sends a message to the destination kernel informing it that non-memory state transfer has completed (Step 9) and that the destination VM can now begin restoring itself (Step 10), that is, loading the saved non-memory state information and executing the destination VM from the restored state. When the non-memory state information is fully restored within the destination VM (Step 11), the destination VM will be functionally identical to the suspended source VM, except for the source VM's memory.

Dealing with memory: The physical memory of the VM (that is, the contents of the virtual memory 230, which the VM views as physical memory) is dealt with differently than all other non-memory state. This is because memory is too large to transfer all at once after the VM has suspended execution. Even over a gigabit link, it will typically take a minimum of 10 seconds per gigabyte of data transferred. A 4 gigabyte VM would therefore have to be suspended for 40 or more seconds, and even longer if the gigabit link is not dedicated to the migration. As a result, according to the invention, the memory is either transferred while the source VM is still running or the destination machine pages it in after the destination VM starts running.

The invention provides for different ways to migrate the source VM's memory, both of which involve paging in from the source VM's memory (Step 12), either on demand or asynchronously, any pages not already copied to the destination, until all the source VM's memory pages have been transferred to the destination (Step 13). One method is for the destination machine to demand page in all memory over the network after the destination VM has started. In other words, a page of memory from the source VM is transferred to the destination VM when the destination VM needs and requests it. This requires a minimal implementation effort but has two disadvantages: First, the destination VM may experience poor performance when it is paging in its physical memory over the network; and second, the destination VM will "die" if the source machine crashes or is rebooted. The second problem can be mitigated to some extent by including a background paging thread that pages in all pages from the source machine. This will limit the amount of time that the destination machine is dependent on the source machine.

Following a more sophisticated method according to the invention, as much memory as possible is transferred asynchronously while the source VM is running. This is done as follows:

1) A thread is created, preferably in the source VM's VMM, whose job it is to push, that is, pre-copy, all of the source VM's memory over to the destination machine.

2) The thread iterates through all physical pages and does the following: (a) The PPN associated with the physical page is write-protected by the source VMM, using known procedures, which may be included in the memory management module 350; and (b) The thread writes the page over to the destination kernel.

If any of the pages that were transferred are modified (the VMM detects this because a write-protect fault will be taken on the page), then the page is marked as modified. Marking may be done as simply—and compactly—as setting a bit in a table (or vector) for the modified page. Note that the first time the destination VM touches any page that has not been copied to the destination machine, it will require a network page fault to the source machine; this fault is then used as a signal to immediately transfer the needed page. Once all pages have been transferred, a list of modified pages is then sent to the destination kernel so it knows that these pages need to be paged in from the source.

According to the invention, it would also be possible to pre-copy the source VM's memory to the destination "iteratively," that is, over multiple "passes," before the non-memory state is transferred. According to this iterative memory transfer procedure, a first set (preferably all) of pages of the source VM's memory is pre-copied to the destination VM. During the time the memory is being transferred, however, the source VM, which is allowed to continue running, may modify some of the transferred pages. Modifications to the source VM's memory may be detected and tracked using any known method, such as a write-protection mechanism or a separate table indicating memory modifications. These modified pages are then re-transferred to the destination. While they are being transferred, however, the source VM may modify other pages (or even modify a previously modified page again). The newly modified pages are then retransferred, and so on.

The system repeats the iterative memory transfer procedure until the number of pages left to be transferred is less than some threshold or the system notices that no forward progress is being made (no reduction in the number of newly modified pages still to be transferred). The threshold (which may be zero), may be determined as an absolute or relative number of pages, either ahead of time, or according to any known adaptive routine.

Each subsequent iteration should take less time because fewer pages will need to be transferred; the transfer process should therefore converge towards a number of modified pages that is small enough that they can transferred rapidly. Any newly modified pages remaining to be copied over after the threshold has been reached may then be transferred after the source VM is suspended and before non-memory state is copied over; alternatively, these remaining pages may be paged in by the destination VM either on demand or asynchronously after the source VM is suspended and the destination VM is resumed from the suspended source state.

The iterative memory transfer method is perhaps best understood by considering an example: For the initial memory transfer, assume that 4096 pages are pre-copied from the source VM to the destination VM, but that the source VM then modifies 1024 of these pages. During a second transfer iteration, the 1024 pages are transferred while the source VM is still running. Assume, however, that during or just after this second iteration, the source VM modifies not only 200 of the 1024 pages but also 100 of the original 3072 (=4096−1024). There will then be 300 modified pages still not transferred. Assume that 300 is less than the chosen threshold. Once the source VM is suspended, these 300 pages can be transferred either before or after the non-memory state is transferred. If they are transferred before the destination VM is resumed, then they are preferably transferred all at once. If they are transferred after the destination VM is resumed, then they may alternatively be paged in either on demand or asynchronously.

Depending on the number of pages that are modified by the source VM while the preparation phase is being executed (see above), this pre-copying solution (iterative or not) may significantly reduce the number of network page faults needed after the destination VM is resumed. This will in turn improve performance as well as shorten the time required for the background paging thread to get all of the memory over to the destination machine.

The pre-paging approach has a couple of disadvantages, however. First, it increases the time it takes to completely migrate a VM—the VM cannot be migrated until all of its memory has been copied over to the destination machine. Second, it requires that more memory be transferred than the first approach—any pages that are modified after they are transferred will have to be transferred twice. The designer of any implementation of the invention may decide which method—demand paging or pre-paging or a hybrid of both—to include by following known design considerations.

Once all the state, including the memory, is transferred and the destination VM is resumed, the source VM, or rather, an exact copy of the source VM, will be installed in the destination server and will function exactly as the source VM did.

Networking: Recall the assumption, for the preferred embodiment of the invention, that the source and destination kernels are attached to the same subnets. This allows the new VM to have the same network connectivity as before. Other methods may also be used to provide network connectivity, such as packet forwarding.

A Media Access Control (MAC) address is the well known, standard, conventional hardware address that uniquely identifies each node of a network. Similar node addressing schemes are found in other networks. The MAC address of each virtual NIC is preferably generated out of the name space of MAC addresses that is owned by the administrator of the server farm system. The MAC address will then not depend on the MAC address of the physical NIC.

Except for a short delay, the user will not be aware that he is now communicating with a different server than before. As a result, once the VM is restored on the destination machine, users of the VM will be entirely unaware that the VM has moved, so that even networking will be able to continue to work flawlessly.

Cleaning up: The source machine can free all resources (including memory) once the last page of memory has been fetched from it and transferred to the destination. This clean-up may be done using known routines, and may be the same as those (with obvious modifications) now used to uninstall VMs.

Disk transfer: As is mentioned above, one assumption made in the preferred embodiment is that the source and destination servers share the storage where the source and destination VMs' disks reside. This arrangement speeds up the transfer process (often greatly) since it eliminates the need to migrate entire disks, which can be very large. As the speed of processors, network connections, and storage devices increases, this assumption may no longer be necessary in order to ensure smooth, substantially unnoticeable VM migration.

Even with existing technology, the invention does not strictly require a common server storage system as long as the additional delay of virtual disk transfer is more acceptable to the VM user than the inconvenience and delay of powering down a running VM. A user might want to transfer his running VM to another remote machine, for example, perhaps for another user to continue using, or for diagnostic purposes, without losing any cached data.

In such cases, the virtual disk may be transferred using the same techniques as are described above for memory transfer, that is, using on-demand and/or asynchronous page (or sector or track, etc.) transfer from the course VM's virtual disk to the destination VM's virtual disk. In addition, the pre-copying techniques used for memory transfer are applicable to disk transfer as well—the disk data can be transferred while the VM is still running and any modified disk blocks (or similar units) can then be fetched by the destination VM after it is restored, either all at once or iteratively.

What is claimed is:

1. A non-transitory computer-readable medium having stored therein instructions which, when executed by a processor, perform a method of migrating a source software abstraction running on a source computer to a destination computer, wherein each of the source and the destination computer is configured to support to support one or more software abstractions running thereon, each software abstraction is executable and has at least one application running therein, the method comprising:
    suspending execution of the source software abstraction;
    after the suspending of the source software abstraction, transferring non-memory state of the source software abstraction to the destination computer, thereby enabling execution of a destination software abstraction on the destination computer from the transferred non-memory state of the source software abstraction; and
    transferring contents of source software abstraction memory to the destination computer, either while the source software abstraction is executing, or after the execution of the destination software abstraction from the transferred non-memory state of the source software abstraction.

2. The non-transitory computer-readable medium of claim 1, the method further comprising:
    executing the destination software abstraction on the destination computer from the transferred non-memory state.

3. The non-transitory computer-readable medium of claim 2, the method further comprising:
    creating the destination software abstraction before suspending the source software abstraction; and
    loading the transferred non-memory state of the source software abstraction into the destination software abstraction.

4. The non-transitory computer-readable medium of claim 2, wherein the contents of the source software abstraction memory are transferred to the destination computer after the execution of the destination software abstraction from the transferred non-memory state of the source software abstraction.

5. The non-transitory computer-readable medium of claim 2, wherein the contents of the source software abstraction memory are transferred to the destination computer while the source software abstraction is executing, and the method further comprising:
    after the suspending of the source software abstraction, retransferring to the destination computer contents of any units of the source software abstraction memory that were modified since contents of the source software abstraction memory were previously transferred from the source computer to the destination computer.

6. The non-transitory computer-readable medium of claim 5, wherein the step of retransferring to the destination computer is performed before the execution of the destination software abstraction from the transferred non-memory state of the source software abstraction.

7. The non-transitory computer-readable medium of claim 5, wherein the step of retransferring to the destination computer is performed after the execution of the destination software abstraction from the transferred non-memory state of the source software abstraction.

8. The non-transitory computer-readable medium of claim 2, wherein the step of transferring contents of source software abstraction memory to the destination computer comprises:
    iteratively transferring the contents of the source software abstraction memory to the destination computer while the source software abstraction is executing, wherein iteratively transferring includes retransferring to the destination computer any units of the source software abstraction memory that were modified since the source software abstraction memory was previously transferred from the source computer to the destination computer.

9. The non-transitory computer-readable medium of claim 2, wherein the source software abstraction's non-memory state does not include contents of a source virtual disk.

10. The non-transitory computer-readable medium of claim 9, the method further including:
    storing the contents of a source virtual disk in a storage arrangement shared by both the source and destination computers; and
    preparing a virtual disk of the destination software abstraction by mapping the virtual disk of the destination software abstraction to the source virtual disk in the shared storage arrangement.

11. The non-transitory computer-readable medium of claim 9, the method further including:
    transferring contents of the source virtual disk on a source storage device to a destination storage device of the destination computer, either while the source software abstraction is executing, or after the execution of the destination software abstraction from the transferred non-memory state of the source software abstraction.

12. The non-transitory computer-readable medium of claim 11, the method further including:
    wherein the contents of the source virtual disk are transferred to the destination storage device after the execution of the destination software abstraction from the transferred non-memory state of the source software abstraction.

13. The non-transitory computer-readable medium of claim 11, wherein the contents of the source virtual disk are transferred to the destination storage device while the source software abstraction is executing, and the method further comprising:
    after the suspending of the source software abstraction, transferring to the destination storage device contents of any disk blocks of the source virtual disk that were modified or added since contents of the source virtual disk were previously transferred from the source virtual disk to the destination storage device.

14. A computer system comprising:
    a source computer having one or more software abstraction running thereon, each software abstraction is executable and has at least one application running therein, the one or more software abstraction including a source software abstraction;
    a destination computer configured to support one or more software abstractions running thereon; and
    computer software executing on the source and destination computers and implementing a method for migrating the source software abstraction to the destination computer, the method comprising:
        suspending execution of the source software abstraction;

after the suspending of the source software abstraction, transferring non-memory state of the source software abstraction to the destination computer;

executing the destination software abstraction on the destination computer from the transferred non-memory state; and transferring contents of source software abstraction memory to the destination computer, either while the source software abstraction is executing, or after the execution of the destination software abstraction from the transferred non-memory state of the source software abstraction.

15. The computer system of claim 14, wherein the contents of the source software abstraction memory are transferred to the destination computer after the execution of the destination software abstraction from the transferred non-memory state of the source software abstraction.

16. The computer system of claim 14, wherein the contents of the source software abstraction memory are transferred to the destination computer while the source software abstraction is executing, and the method further comprising:

after the suspending of the source software abstraction, retransferring to the destination computer contents of any units of the source software abstraction memory that were modified since contents of the source software abstraction memory were previously transferred from the source computer to the destination computer.

17. The computer system of claim 14, wherein the step of transferring contents of source software abstraction memory to the destination computer comprises:

iteratively transferring the contents of the source software abstraction memory to the destination computer while the source software abstraction is executing, wherein iteratively transferring includes retransferring to the destination computer any units of the source software abstraction memory that were modified since the source software abstraction memory was previously transferred from the source computer to the destination computer.

18. The computer system of claim 17, wherein the retransferring of the units of the source software abstraction memory that were modified is executed a plurality of times.

19. The computer system of claim 18, wherein retransferring of the units of the source software abstraction memory that were modified is repeated until the number of the units is less than a threshold value, and then transferring the number of units after suspending the source software abstraction.

20. A method of migrating a source software abstraction running on a source computer to a destination computer, wherein each of the source and the destination computer is configured to support to support one or more software abstractions running thereon, each software abstraction is executable and has at least one application running therein, the method comprising:

suspending execution of the source software abstraction;

after the suspending of the source software abstraction, transferring non-memory state of the source software abstraction to the destination computer, thereby enabling execution of a destination software abstraction on the destination computer from the transferred non-memory state of the source software abstraction; and transferring contents of source software abstraction memory to the destination computer, either while the source software abstraction is executing, or after the execution of the destination software abstraction from the transferred non-memory state of the source software abstraction.

* * * * *